United States Patent Office 3,755,500
Patented Aug. 28, 1973

3,755,500
POLYOLEFIN COMPOSITIONS COMPRISING POLYMERIZED 4-METHYL-PENTENE-1
Keith Jasper Clark, Welwyn Garden City, England, assignor to Imperial Chemical Industries Limited, London, England
No Drawing. Continuation of application Ser. No. 457,824, May 21, 1965. This application Jan. 22, 1970, Ser. No. 6,019
Claims priority, application Great Britain, May 27, 1964, 21,958/64; Aug. 4, 1964, 31,604/64; Apr. 15, 1965, 16,271/65
Int. Cl. C08f 15/04
U.S. Cl. 260—878 R       19 Claims

ABSTRACT OF THE DISCLOSURE

A polymeric composition of 4-methyl pentene-1 having dispersed through it a small proportion of polymerized units of an aliphatic olefin, the homopolymer of said aliphatic olefin having a melting point above 275° C., preferably above 320° C. The composition may also include units of a linear 1-olefin having 4 to 18 carbon atoms. The composition is prepared by sequential polymerization of 4-methyl pentene-1 and the aliphatic olefin. The composition may be moulded into articles having a mean spherulite size of less than 5 microns, which, if the polymer has a low ash content, may have a light transmission in ⅛" section of at least 90%.

---

This invention relates to polyolefine compositions.

The object of the present invention is to provide 4-methyl pentene-1 polymer compositions having finer crystalline texture than those previously available. A fine crystalline texture has numerous advantages which will appear hereinafter.

According to the present invention we provide an outstandingly fine crystalline texture polymeric composition, made up predominantly of 4-methyl pentene-1 monomer units, having a melt flow index (measured by ASTM Method 1238–57T using a 5 kg. weight at 260° C.) of between 0.01 and 1000, and containing dispersed throughout the composition up to 5% by weight of polymer of a second component which is an aliphatic 1-olefine, the homopolymer of which melts at above 275° C. and preferably at above 320° C., said polymer being present in a quantity such that the polymeric composition has a mean spherulite size when quench compression moulded from 265–280° C. of not more than 5 microns. We also provide an outstandingly fine crystalline texture polymeric composition, made up predominantly of 4-methyl pentene-1 monomer units, having a melt flow index (measured by ASTM Method 1238–57T using a 5 kg. weight at 260° C.) of between 0.01 and 1000, and, containing dispersed throughout the composition polymer of a second component which is an aliphatic 1-olefine, the homopolymer of which melts at above 275° C. and preferably at above 320° C., said polymer being present in a quantity such that the polymeric composition has a mean spherulite size when quench compression moulded from 265–280° C. of not more than 5 microns that has a low ash content, i.e. of less than 0.02% by weight, the transparency of the polymer compositions being outstandingly high, i.e. the polymer compositions having a light transmission, measured by ASTM Test D 1746–62T, of at least 90% and a haze, measured by ASTM Test D 1003–59T, of preferably less than 5% in ⅛" section. In such compositions of high transparency it is necessary that the polymer of the second component is present in quantity sufficiently low (e.g. generally less than 1% by weight) and/or is homogeneously dispersed throughout the composition to a sufficient extent, otherwise portions of polymer may reduce transparency by acting as light scattering centres. Dispersion processes should not cause the melt flow index as defined above of the composition to become greater than 1000; unduly prolonged treatment at too high temperature must therefore be avoided.

Particularly suitable second components are 3-methyl pentene-1 and 4,4-dimethyl pentene-1 (both homopolymers melt at above 350° C.); 3-methyl butene-1, with homopolymer melting at 310° C., is also useful. 3-methyl hexene-1 and 3-ethyl pentene-1, whose homopolymers melt above 350° C., may also be employed, as also may vinylcyclohexane, whose homopolymer melts at 342° C.

The concentration of polymer of the second component present in the polymer compositions of this invention is preferably less than 1% and may be difficult to measure because infra-red measurement of it is not effective at concentrations of less than 0.5–1%. However, the presence of the said polymer in the composition may readily be inferred when the second component has been present during the polymerisation reaction and the polymer obtained has a mean spherulite size not more than 5 microns. Sometimes the concentration of second component may be calculated from the method used to manufacture the composition.

The invention also comprises a process for making compositions according to the invention which comprises sequentially polymerising 4-methyl pentene-1 with a second component which is an aliphatic 1-olefine, the homopolymer of which melts at above 275° C., and preferably at above 320° C., in the presence of a stereospecific catalyst.

The methods of carrying out the sequential polymerisation fall into two broad groups: (a) polymerising the second component before any substantial quantity of any other monomer has been polymerised, and (b) polymerising the second component subsequent to the polymerisation of another monomer or monomers. It is found that methods of group (a) do not generally give such a good dispersion of second component polymer throughout the composition as is obtained by methods of group (b), and in consequence the resulting compositions tend to have lower transparency, particularly at higher concentrations of second component. This disadvantage can be overcome to some extent by melt homogenisation of the resulting composition, e.g. in an extruder or other polymer compounding apparatus. Methods of group (a) have the advantage that they allow the step of polymerising the second component to be carried out in a separate preliminary stage. The second component generally polymerises much more slowly than 4-methyl pentene-1, and it is required in the final composition only in very small proportions. If it is added for polymerisation after the 4-methyl pentene-1, either a long additional polymerisation time will be required involving all the process ingredients and therefore a large reaction vessel, or it will be necessary to polymerise only part of a large excess of the second component and then separate unreacted second component from the diluent recovered. Both these alternatives are expensive.

It is therefore highly advantageous to carry out the polymerisation of the second component in a separate preliminary stage, since this may be done on a much smaller scale, where longer reaction times are much less expensive. Indeed, the polymerisation of the second component in this way may simply be regarded as an extra stage in the preparation of the catalyst for the 4-methyl pentene-1 polymerisation. Suitable amounts of second component to use in this preliminary stage may be from 10 to 1000% by weight of the catalyst. Examples 46–65 following illustrate this procedure.

The convenience of methods of group (a) can be combined to some extent with the improved dispersion obtained by methods of group (b) by initially polymerising 4-methyl pentene-1 or a linear 1-olefine having from 4 to 18 carbon atoms in small amount, subsequently polymerising the second component and thereafter polymerising the bulk of the 4-methyl pentene-1. Examples 52–58 and 61–65 following illustrate this procedure. As explained below, this may conveniently be done by contacting the catalyst in a first stage with a small amount of a mixture of second component and 4-methyl pentene-1 or linear 1-olefine and subsequently contacting the catalyst with the bulk of the 4-methyl pentene-1 in a second stage.

Sequential polymerisation according to our invention does not necessarily require 4-methyl pentene-1 and the second component to be added to the polymerisation zone at different times. This is because the second components in general polymerise much more slowly than 4-methyl pentene-1. In one method of carrying out the process of our invention, 4-methyl pentene-1 and the second component are both present together in the polymerisation zone and polymerisation is then carried out for a time sufficient to polymerise substantially all the 4-methyl pentene-1 monomer and subsequently to polymerise at least some of the second component. This method clearly falls into group (b) above.

This is illustrated by Examples 2, 3 and 4 below. In these Examples the 4-methyl pentene-1 is essentially completely polymerised in 4 hours. In Example 2 there is a very low concentration of 3-methyl pentene-1 present and a further 10 hours polymerisation time is required to obtain a polymeric composition according to this invention. In Examples 3 and 4 larger quantities of 3-methyl pentene-1 are used, and shorter polymerisation times are sufficient to produce polymeric compositions according to the invention. Reduction of the time for polymerising the second component may be effected by a variety of expedients such as adding this momomer at the time when its polymerisation is required, increasing the catalyst concentration, increasing the polymerisation temperature and/or increasing the catalyst activity by, for example, adding a small amount of oxygen to the polymerisation system.

An experiment under the same conditions as Example 2 in which 3-methyl pentene-1 was replaced by 3-methyl butene-1 did not result in a polymer composition of our invention even after 18 hours polymerisation. However, when a substantially higher content of 3-methyl butene-1 is used in Example 7 products of our invention are obtained: in fact a composition with a higher content of second component polymer is obtained so that it was necessary to melt homogenise the composition to convert it to one with the high transparency provided by this invention.

The effect of relatively high concentrations of second component in reducing transparency varies with the particular second component used and the method by which the polymeric composition is made. Generally no trouble is found with any second component at levels of below 1% in the polymer. Above this level 3-methyl butene-1 tends to reduce transparency below the 90% light transmission level. 3-methyl pentene-1 and 4,4-dimethyl pentene are alike in their behaviour; when the polymer composition is made by methods of group (a) up to 2% by weight of these second components give compositions having light transmissions of the order of 90%, while when the polymer composition is made by methods of group (b) up to 4% by weight of these second components give light transmissions of the order of 90%. Above these limits the light transmissions of the polymer compositions fall off with increasing content of second component; but at levels below 5% these light transmissions are generally improved by melt homogenisation.

Polymer compositions according to the invention may be made by melt-homogenising mixtures of coarse-textured 4-methyl pentene-1 polymers with fine-textured 4-methyl pentene-1 polymers made according to the polymerisation process of the invention. This procedure is illustrated in Examples 5 and 6 below.

Besides the second component, the polymers of our invention may also optionally comprise a minor proportion of third component which is one or more linear 1-olefines having from 4 to 18 carbon atoms, preferably in an amount of up to 30% by weight. These three-component copolymers are in general as transparent as, and in many cases more transparent than, the two-component polymer compositions of our invention, and they can have other improved properties including a lower melting point and a wider melting range, thus resulting in greater ease of fabricating, and, in the case of linear 1-olefine contents above about 8% by weight, considerably increased flexibility.

It is convenient to use a stereospecific catalyst (as defined below) for polymerisation according to the process of the invention, for in this way a free-flowing slurry may be obtained which is easy to de-ash to the high degree desirable to give highly transparent polymer. By a stereospecific catalyst we mean one which under equivalent conditions will polymerise propylene to solid polypropylene which is at least 70% insoluble in boiling n-heptane. Numerous catalysts which will do this are known—each experienced worker in the art of low pressure olefine polymerisation will have his own preferred formulation. Many suitable catalysts are described in Gaylord and Mark "Linear and Stereoregular Addition Polymers," Interscience 1959. Generally these catalysts comprise a transition metal compound from Groups IV to VIII and an organometallic activator. Most widely used are those catalysts which comprise a titanium halide, e.g. titanium trichloride, activated by an organometallic aluminium compound, e.g. an aluminium trialkyl or alkyl chloride. We prefer to use the material obtained by reacting titanium tetrachloride with aluminium alkyl sesquichloride in a purified alkane medium with stirring in an inert atmosphere at about 0° C., preferably by adding a solution of the sesquichloride gradually (preferably dropwise) to a solution of the $TiCl_4$. The product so obtained may be washed with fresh hydrocarbon and submitted to one or more heat treatments between 60° and 150° C. before use. As activator for this material we prefer to use dialkyl aluminium chloride.

Polymerisation is carried out in the absence of air and water, or in the presence of only limited amounts of these, since in other than small concentrations both air and water de-activate the catalyst. Conveniently an inert hydrocarbon is used as polymerisation medium. Nitrogen is often used to purge the apparatus beforehand. Where three-component copolymers are to be made, various techniques are available for copolymerising the monomers. 4-methyl pentene-1 boils at 54° C.; butene-1 at −5° C., pentene-1 at 30° C., hexene-1 at 63° C. and heptene-1 at 93° C.; the higher linear 1-olefines all boil above 100° C. Superatmospheric pressure may be used. Hydrogen may be used to reduced the molecular weight and raise the melt index of the polymer composition.

The addition of the third components may be made in a random manner by passing the 4-methyl pentene-1 and third component into the reaction vessel at predetermined rates so that the concentration of both in the reaction mixture is constant throughout. Alternatively, the third component may be added in one or more controlled periods, such periods being at spaced intervals. We prefer to polymerise in such a manner that polymer is obtained in the form of a free-flowing slurry of polymer in diluent, rather than as a solution or sticky gel. This is because slurries are easier to handle and to de-ash efficiently. The higher the temperature and the more third component there is present, the greater is the tendency for a gel rather than a slurry to form. Beginning polymerisation with 4-methyl pentene-1 or second component in the absence of any third component and at a relatively low temperature gives a slurry of improved stability. Such a slurry will subsequently withstand higher polymerisation temperatures, or the addition of more third component, or the production of slurries of high concentration without gelling. It may be convenient to form between 1 and 15% by weight of the total amount of copolymer in this way before any third component is added.

De-ashing of the polymer slurry obtained by polymerisation is preferably carried out using dry reagents; if reagents containing water or aqueous extraction processes are used, the polymer obtained often shows an undesirable "blue haze" and may not be of the highest transparency. De-ashing may be carried out in two main ways. One is by adding a small quantity of reagent to the slurry, digesting for a period at a moderate temperature, e.g. between 20° and 60° C., followed by filtration and washing with more de-ashing reagents or hydrocarbon or mixtures of the two. The other is first to separate all or most of the polymerisation diluent from the polymer produced and then to re-slurry the polymer one or more times in de-ashing reagent. In the first process the most suitable types of de-ashing reagents are the hydrocarbon-miscible alcohols such as isopropanol, n-butanol or isobutanol, or the higher alcohols such as 3,5,5-trimethyl hexanol and isodecanol and higher acids and amines such as n-nonoic acid and 3,5,5-trimethylhexylamine. Particularly effective are mixtures of alcohols with complex-forming carbonyl compounds, such as isopropanol mixed with acetyl-acetone. In the second process it is of particular advantage to use the lower alcohols, such as methanol and ethanol, because of their cheapness.

We believe that true block copolymers, i.e. materials containing two or more linked segments of different polymer chains, are generally not formed, or not formed to any substantial degree, during sequential polymerisation according to our invention. However, whether this is so or not is irrelevant to the operation of our invention and to the advantages obtainable thereby.

The polymer compositions made by our invention may be manufactured into articles by a variety of known techniques, e.g. extrusion, injection moulding, compression moulding and blow-moulding. Their fine crystalline texture has numerous advantages. The tendency to void formation in mouldings is reduced. Furthermore, fine-textured poly-4-methyl pentene-1 according to our invention has better environmental stress cracking resistance than similar polymers of coarser texture. This is shown by better resistance to crazing both in steam at 140° C. and in detergent solution at 65° C. Also the transparency of articles made from the highly transparent compositions of low ash content is materially increased and is very much less dependent on rate of cooling from the melt than is the case with 4-methyl pentene-1 homopolymers or copolymers of coarser texture. Moreover, the crystallisation rate is increased and hence moulding cycle time is reduced. Very useful transparent bottles may be made from the highly transparent polymer compositions by blow-moulding; numerous other transparent articles may be made by injection moulding, blow-moulding or extrusion. Convenient processing temperatures are from 275 to 300° C., through compositions containing relatively large proportions of third component may be used at somewhat lower temperatures. Where the second component is 3-methyl butene-1, in order to get the best possible transparency it is desirable to keep processing temperatures below 310° C. Three-component copolymers may vary in mechanical properties according to the amount of third component which they contain; those which contain only 1 or 2% of third component are relatively rigid, while higher amounts of third component make the copolymer progressively more flexible. Materials may be made having any flexural modulus in the range $1.8–0.15 \times 10^{10}$ dynes/sq. cm., that is, from slightly stiffer than polypropylene to about as stiff as low-density polyethene. Higher 1-olefins increase flexibility more than lower 1-olefins. The polymer compositions, particularly the three-component copolymers, show a reduced tendency to lose transparency on exposure to steam, as compared both with 4-methyl pentene-1 homopolymer and with copolymers of coarser texture.

Articles, e.g. milk bottles, made from the three-component copolymers of our invention which contain at least 2% by weight of a linear 1-olefin may be steam-sterilised at temperatures up to 130° C. with minimal lose in transparency. Sheet, fibres and films may also be made from the polymer compositions.

In the following examples the compression mouldings are made in the following way.

6.5 gm. of polymer were pre-moulded at room temperature using a 2" x 1¾" x ⅛" template to a pressure of 20 tons on a 4" diameter ram for approximately ¼ minute. The actual moulding was then made by pressing the premouding, in its template, in an electric press, maintained at a temperature of 265 or 280° C., for 5 minutes at a pressure of 20 tons on a 4" diameter ram. It was then either quenched or cooled in the press.

Quenching was carried out at the end of the 5 minute period by removing the template from the press as quickly as possible and plunging it into a large ice/water bath, where it was allowed to remain for a further period of 5 minutes. When cooling in the press, the press was switched off and cooled to room temperature in ten minutes using a compressed air/water spray cooling system, the pressure on the template being maintained at 20 tons.

Average spherulite sizes were measured using a polarising microscope, a high intensity light source and a National Physical Laboratory calibrated graticule. Light transmissions were measured by ASTM Test 1746–62T and hazes by ASTM Test 1003–61T, using alive oil as an immersion medium to blank out scattering by surface imperfections.

Determinations of weight percent of second component in the compositions were made on a double-beam infrared spectrophotometer. In general it was found possible to measure the poly-3-methyl butene-1 content down to 1%, the poly-3-methyl pentene-1 content down to 0.5% and the poly-4,4-dimethyl pentene-1 content down to 2% by weight.

The following examples illustrate our invention but do not limit it in any way.

EXAMPLE 1

To a stirred reaction mixture of a high-boiling petrol fraction (500 ml.), aluminium diethyl chloride (18 millimoles) and titanium trichloride (6 millimoles) at 60° C. were added under air and water-free conditions, 4-methyl pentene-1 as an initial charge of 150 ml. and subsequent feed of 100 ml. over 1 hour. The reaction was allowed to proceed for a further 3 hours, after which 3-methyl butene-1 (100 ml.) was added and the polymerisation continued for 1 hour. The reaction was terminated by the addition of dry isopropanol mixed with dry acetylacetone, and the polymer powder filtered and washed under nitrogen, and dried.

148.6 gm. of a polymer composition containing, according to infra-red measurements, between 0 and 1% by weight of 3-methyl butene-1 were obtained. A ⅛" compression moulding, quenched from 265° C., had a 96% light transmission and a mean spherulite size of <1µ. Poly-4-methyl pentene-1 similarly prepared but in the absence of 3-methyl butene-1 gave a light transmission of 83%.

The titanium trichloride used in this example was prepared as follows: titanium tetrachloride was reduced by dissolving it in a purified aliphatic hydrocarbon at 0° C. and adding aluminium ethyl sesquichloride thereto drop by drop with stirring over a period of several hours. The product obtained was washed with more of the aliphatic hydrocarbon and heat treated for a period at 90° C.

EXAMPLE 2

Under air- and water-free conditions a stirred mixture of a high boiling paraffin fraction (1 litre), aluminium diethyl chloride (36 millimoles) and titanium trichloride (12 millimoles) was added to 168 ml. of a 0.5% by volume solution of 3-methyl pentene-1 in 4-mthyl pentene-1 at 60° C. Further quantities of the monomer mixture were added at a rate of 150 ml./hour over 2 hours. At the end of this time the temperature was increased to 70° C. and polymerisation continued without further addition of monomer. Samples were taken at 2-hourly intervals. Each sample was worked up by treatment with excess of a solution of dry acetylacetone in dry isopropanol, and washing of the isolated polymer with dry isopropanol before drying at 70° C. in a vacuum oven. Infra-red analysis indicated that <1% 3-methyl pentene-1 units were present in the composition. The polymer samples were compression moulded at 280° C. and quenched.

Mouldings were examined for spherulite size.

TABLE 1

| Polymerisation time (hours) | Spherulite size (µ) | | |
|---|---|---|---|
| | Maximum | Mean | Minimum |
| 4 | 100 | 60 | <1 |
| 6 | 50 | 30 | <1 |
| 8 | 25 | 20 | <1 |
| 10 | 12 | 8 | <1 |
| 12 | 10 | 6 | <1 |
| 14 | 6 | 3 | <1 |
| 16 | 6 | 4 | <1 |
| 18 | 4 | 2 | <1 |
| 20 | 6 | 4 | <1 |

The light transmission of the 14 hour sample moulding was 95%.

The titanium chloride used in Example 2 was prepared by reaction of $TiCl_4$ and aluminium ethyl sesquichloride in a hydrocarbon fraction (boiling range 170–200° C.). A solution of the sesquichloride was added gradually drop by drop, with stirring to a solution of $TiCl_4$ over a period of several hours, the temperature being held at 0° C. The molar ratio of total aluminium to titanium was approximately 1.6. The precipitate containing $TiCl_3$ thus formed was separated, washed with more of the hydrocarbon fraction and then heated for a period at 85° C. It was introduced into the polymerisation vessel in the form of a slurry in a small quantity of hydrocarbon.

EXAMPLE 3

Example 2 was repeated, but using a solution of 2% by volume 3-methyl pentene-1 in 4-methyl pentene-1. The following results were obtained. (Infra-red analysis indicated that the polymer composition contained <1% 3-methyl pentene-1 units.)

TABLE 2

| Polymerisation time (hours) | Spherulite size (µ) | | |
|---|---|---|---|
| | Maximum | Mean | Minimum |
| 4 | 40 | 20 | <1 |
| 6 | 12 | 6 | <1 |
| 8 | 6 | 4 | <1 |
| 10 | 4 | 2 | <1 |
| 12 | ~1 | ~1 | <1 |
| 14 | ~1 | ~1 | <1 |

The 12 hour sample moulding gave a light transmission of 98%.

EXAMPLE 4

Example 1 was repeated, but using a solution of 2.5% by volume 3-methyl pentene-1 in 4-methyl pentene-1; this gave the following results. (Infra-red analysis indicated that the copolymer contained <1% 3-methyl pentene-1 units.)

TABLE 3

| Polymerisation time (hours) | Spherulite size (µ) | | |
|---|---|---|---|
| | Maximum | Mean | Minimum |
| 5 | 10 | 3 | <1 |
| 6 | 8 | 3 | <1 |

In this example compression mouldings were made at 265° C.

Comparative Experiment A

Example 2 was repeated, but using monomer not treated with 3-methyl pentene-1, and gave at the end of 20 hours polymerisation polymer which on compression moulding at 280° C., had maximum, mean and minimum spherulite sizes of 120, 80 and <1µ respectively.

EXAMPLE 5

A mixture of 90 parts of poly(4-methyl pentene-1) of mean spherulite size 40 (made by polymerising 4-methyl pentene-1 containing about 0.5% 3-methyl pentene-1 for a total time of 6 hours at 60° C., conditions otherwise being as in Example 2) and 10 parts of poly-(4-methyl pentene-1) of light transmission 94% and mean spherulite size below 1µ (made as described in Example 9 below) was blended in a Baker Perkins masticator in an inert atmosphere at 300° C. over 1 hour. The resulting polymer gave ⅛" compression mouldings (with quenching) at 280° C. that had a mean spherulite size of 5µ (maximum 8µ) and a transmission of 90%.

EXAMPLE 6

Example 5 was repeated using a 50% mixture of the same fine and coarse-textured polymers and gave ⅛" compression mouldings of mean spherulite size 3µ (maximum 5µ) and transmission 90%.

EXAMPLE 7

Under air- and water-free conditions, a mixture of a high boiling petrol fraction (500 ml.), 4-methyl pentene-1 (240 ml.), 3-methyl butene-1 (100 ml., Philips Pure grade), titanium trichloride (6 millimoles) and aluminium diethyl chloride (18 millimoles) was stirred at 50° C., and further quantities of 4-methyl pentene-1 added at a rate of 60 ml./hour over 2 hours. The reaction was continued for 4 more hours and the polymer obtained was then worked up as in Example 2. 159 gm. of fine white powder were obtained. Infra-red analysis indicated that 1% w/w 3-methyl butene-1 was present in the polymer. ⅛″ compression moulding quenched from 290° C. had 85% light transmission, and maximum, mean and minimum spherulite sizes of 3, 2 and <1μ respectively.

Homogenisation, by stirring of the melt in a Baker Perkins vertical masticator at 300° C. under nitrogen over 1 hour, of this material improves its light-transmitting properties; thus an ⅛″ plaque of masticated polymer can have light transmission of over 90%.

EXAMPLE 8

Under air- and water-free conditions, a mixture of a high boiling petrol fraction (1000 ml.), titanium trichloride (12 millimoles, prepared as in Example 2), aluminium diethyl chloride (36 millimoles) and a 10% by volume solution of 4,4-dimethyl pentene-1 in 4-methyl pentene-1 (168 ml.) was stirred at 60° C. Further quantities of the same monomer solution were added over a period of two hours at a rate of 150 ml./hour. The temperature was then raised to 70° C. and polymerisation continued without further addition of monomer. Samples of the polymer found were taken at intervals. Each sample was worked up and moulded as in Example 2. Infra-red analysis indicated that less than 1% 4,4-dimethyl pentene-1 units were present in all the polymer samples. Mouldings were examined for spherulite size and in some cases for light transmission.

TABLE 4

| Polymerisation time, hours | Spherulite size (μ) | | | Light transmission, percent |
|---|---|---|---|---|
| | Maximum | Mean | Minimum | |
| 2 | 100 | 50 | <1 | 69 |
| 3 | 15 | 10 | <1 | 86 |
| 5 | 1 | <1 | <1 | |
| 21 | <1 | <1 | <1 | 96 |

The hazes in the 3 hours and 21 hour samples were both below 5%.

EXAMPLE 9

Under air- and water-free conditions, a mixture of a high boiling petrol fraction (500 ml.), titanium trichloride (6 millimoles, prepared as in Example 2), diethyl aluminium chloride (18 millimoles) and 4-methyl pentene-1 containing 0.5% by volume of 3-methyl pentenes-1 (84 ml.) was stirred at 60° C.; further quantities of the same solution were added at a rate of 75 ml./hour for two hours. Polymerisation was continued for a further 4 hours at 60° C. The temperature was then raised to 70° C., 4.5 millimoles of oxygen were introduced into the system and polymerisation continued. Samples were taken at intervals, being worked up and moulded as in Example 2 (except that moulding temperatures of 265° C. were used).

The following results were obtained:

TABLE 5

| Polymerisation time, hours | Spherulite size (μ) | | Light Transmission, percent |
|---|---|---|---|
| | Maximum | Mean | |
| 8 | 2 | 1 | 94 |
| 10 | 2 | 1 | 95 |
| 12 | 2 | 1 | 93 |
| 14 | 2 | 1 | 96 |
| 16 | 2 | 1 | 94 |

All samples showed less than 5% haze.

EXAMPLE 10

In a litre flask, under air- and water-free conditions, were mixed together 500 ml. of a high boiling paraffin fraction, 240 ml. 4-methyl pentene-1, 18 millimoles diethyl aluminium chloride and 6 millimoles titanium trichloride (prepared as in Example 2). Polymerisation took place for 3 hours at 60° C. 100 ml. 3-methyl pentene-1 were then added and polymerisation continued for 2 hours at 60° C. The reaction was then killed with dry isopropanol and de-ashed by washing with a mixture of dry acetylacetone and dry isopropanol. The polymer was dried in a vacuum overnight. 155 gm. polymer were obtained; infra-red analysis indicated the presence of 3% by weight of 3-methyl pentene-1. A compression moulding was made at 265° C. and quenched. It should a mean spherulite size of <1μ; particle boundaries were evident in the moulding and the light transmission was 72%. A second sample of the polymer was masticated in a Baker Perkins vertical masticator at 300° C. under nitrogen for one hour and subsequently compression moulded. The moulding showed no trace of particle boundaries and had considerably improved light transmission; it was, however, rather brittle.

EXAMPLE 11

A flask fitted with a stirrer was carefully dried and purged of air with a current of nitrogen. In it were placed 1 litre of a high boiling paraffin hydrocarbon fraction as diluent, 109.8 gm. of an approximately 0.5% by volume solution of 3-methyl pentene-1 in 4-methyl pentene-1, 2.2 gm. n-pentene-1, 24 ml. of 1.5 molar diethyl aluminium chloride solution in diluent and 12 ml. of a 1.0 molar suspension of titanium trichloride in diluent (prepared as in Example 2). Polymerisation began at once. The polymerisation temperature was maintained at 60° C. For two hours further quantities of a monomer mixture consisting of the same 4-methyl pentene-1 solution with 2% by weight of the mixture of pentene-1 were gradually fed to the polymerisation vessel; the total mass of monomer added in this way was 200 gm. The temperature was then raised to 70°C. and a polymer sample was taken after 2 hours; polymerisation was then continued for a further 15 hours. Then a mixture of 30 ml. dry acetylacetone with 200 ml. of dry isopropanol was added and the mixture digested for two hours at 60° C. The reaction mixture was then filtered, and the solid polymer obtained washed five times with 400 ml. lots of dry isopropanol. All these operations were performed under nitrogen. Finally, the polymer was dried overnight in a vacuum oven at 60° C. Both polymers were compression moulded and optical properties are shown in Table 6.

EXAMPLES 12–14

Example 11 was repeated under identical conditions, but using as the third component hexene-1 (2% by weight);

hexene-1 (5% by weight); and a mixture of $C_{12}$–$C_{16}$ linear 1-olefines comprising approximately 33% molar dodecene, 33% molar tetradecene and 33% molar hexadecene (2% by weight). Properties of mouldings are shown in Table 6.

EXAMPLES 15–17

Example 11 was repeated under identical conditions, but using as the third component octene-1 (2% by weight); decene-1 (2% by weight); and a mixture of $C_6$–$C_{10}$ olefines comprising approximately 33% molar hexene-1, 3% molar octene-1 and 33% molar decene-1 (2% by weight); moreover the total polymerisation period was not 19 hours at 60° C., but 14 hours at 60° C. followed by a further 48 hours at 20° C. Properties of mouldings are shown in Table 6.

EXAMPLE 18

Example 11 was repeated, but using no linear 1-olefine third component. Properties of mouldings are shown in Table 6. Where not otherwise specified, measurements in Table 6 are made on quenched mouldings.

In all the materials obtained for Examples 11–18 infrared analysis indicated that less than 1% by weight of 3-methyl pentene-1 was present.

ml.) at 60° C. in an atmosphere of nitrogen and stirring continued for 66 hours. At the end of this time 4-methyl pentene-1 was fed to the mixture at a rate of approximately 8.25 gm./5 minutes for 2 hours (total 200 gm.) and polymerisation allowed to continue for a further 2 hours when dry acetylacetone (20 ml.) and dry isopropanol (80 ml.) were added and the mixture stirred for 2 hours. The polymer was then separated by filtration, washed by re-slurrying with dry isopropanol (four lots of 250 ml. each) in an atmosphere of nitrogen at 56° C. and dried in a vacuum oven for 18 hours at 60° C./0.3 mm. Hg. Yield 179.5 gm. of polymer.

Method 2—Example 27

Aluminium diethylchloride (16 millimoles) and titanium trichloride (8 millimoles, prepared as in Example 2) were added to a stirred solution of 3-methyl pentene-1 (3.2 gm.) in a high boiling hydrocarbon diluent (500 ml.) at 60° C. in an atmosphere of nitrogen. To this mixture 4-methyl pentene-1 was added at a rate of 16.6 gm./hour for 11.5 hours (total 190.9 gm.) and stirring at 60° C. continued for a further 12 hours. The polymerisation was then killed and the polymer recovered exactly as in Method 1. Yield 186.5 gm. of polymer.

TABLE 6

| Example | Third component | Weight percent third component | Polymerisation time (hours) | Quenched moulding Light Transmission, percent | Quenched moulding Haze, percent | Slow-cooled moulding Light transmission, percent | Slow-cooled moulding Haze, percent | Mean spherulite size ($\mu$) | After steam sterilization at 130° C. for ½ hour Light transmission, percent | After steam sterilization at 130° C. for ½ hour Haze, percent | Flexural Modulus ($\times 10^{-10}$ dynes/cm.) |
|---|---|---|---|---|---|---|---|---|---|---|---|
| 11 | Pentene-1 | 2 | 19 | 95 | 2.8 | 91 | 7.3 | <2 | 80 | <10 | 1.44 |
|  |  |  | 4 | 87 | 1.8 | 64 | 3.0 | >25 | 12 | 89 |  |
| 12 | Hexene-1 | 2 | 19 | 98 | 1.6 | 93 | 6.5 | <2 | 88 | <10 | 1.48 |
|  |  |  | 4 | 80 | 1.1 | 38 | 13.7 | >25 | 9.2 | 87 |  |
| 13 | do | 5 | 19 | 98 | 1.8 | 96 | 4.0 | <2 | 89 | 6.2 | 1.04 |
|  |  |  | 4 | 87 | 2.5 | 72 | 8.0 | >25 | 41 | 27.5 |  |
| 14 | $C_{12}$–$C_{16}$ 1-olefines | 2 | 19 | 97 | 1.7 | 95 | 4.6 | <2 |  |  |  |
|  |  |  | 4 | 80 | 1.8 | 56 |  | >25 | 23.5 | 64 |  |
| 15 | Octene-1 | 2 | 62 | 98 | 1.6 | 96 | 3.6 | <2 | 83 | <10 | 1.39 |
|  |  |  | 4 | 79 | 1.6 | 25 | 7.8 | >25 | 8.6 | 83 |  |
| 16 | Decene-1 | 2 | 62 | 98 | 1.5 | 97 | 3.5 | <2 | 78 | <10 | 1.37 |
|  |  |  | 4 | 90 | 2.2 | 47 | 4.8 | >25 | 11 | 87 |  |
| 17 | $C_6$–$C_{10}$ olefines | 2 | 62 | 97 | <10 | 95 | 4.0 | <2 | 87 | <10 | 1.52 |
|  |  |  | 4 | 85 | 4.2 | 63 |  | >25 | 23 | 46 |  |
| 18 | None | None | 19 | 95 | 1.5 | 88 | 10.3 | <2 | 79 | 24 | 1.77 |
|  |  |  | 4 | 82 | 4.4 | 20 | >10 | >25 | 21 | 66 |  |

EXAMPLES 19–45

Details of these examples, and of the properties of mouldings made from the polymers obtained, are shown in Table 7. The examples were carried out by four different methods; one illustration of each method is given below. It will be noted that, regarding the two broad groups of sequential polymerisation methods previously discussed, method 1 falls into group (a) while methods 2, 3 and 4 fall into group (b). Examples done by the same method differ from one another only in the nature and amount of second component used and the times taken to add the 4-methyl pentene-1 and to polymerise the second component.

Method 1.—Example 19

Aluminium diethylchloride (10 millimoles) and titanium trichloride (8 millimoles, prepared as in Example 2) were added to a stirred solution of 3-methyl pentene-1 (2.0 gm.) in high boiling hydrocarbon diluent (500 ml.) at 60° C. in an atmosphere of nitrogen and stirring

Method 3.—Example 35

Aluminium diethylchloride (16 millimoles) and titanium trichloride (8 millimoles, prepared as in Example 2) were added to a stirred solution of 4-methyl pentene-1 (66.5 gm.) in a high boiling hydrocarbon diluent (500 ml.) at 60° C. in an atmosphere of nitrogen. To this mixture 4-methyl pentene-1 was added at a rate of approximately 5.3 gm./5 minutes for 2 hours (total 4-methyl pentene-1, 200 gm.) and stirring at 70° C. continued for a further 17 hours. At the end of this time, 3-methyl pentene-1 (2.0 gm.) was added to the mixture and stirring was continued at 70° C. for a further 24 hours. Then the polymerisation was killed and the polymer recovered exactly as in Method 1. Yield 190 gm. of polymer.

Method 4.—Example 44

Aluminium diethylchloride (16 millimoles) and titanium trichloride (8 millimoles, prepared as in Example 2) were added to a stirred solution of 4-methyl pentene-1

(12 gm.) in a high boiling hydrocarbon diluent (500 ml.) at 30° C. in an atmosphere of nitrogen and stirring continued for 7 hours. At the end of this time, the temperature of the polymerisation mixture was raised to 60° C. and 3-methylpentene-1 (1.5 gm.) added. After 16 hours 4-methyl pentene-1 (188 gm.) was fed to the mixture at a rate of 8 gm./5 minutes for approximately 2 hours (total 4-methyl pentene-1, 200 gm. and polymerisation allowed to continue for a further 2 hours at 60° C. Then the polymerisation was killed and the polymer recovered exactly as in Method 1. Yield 184 gm. of polymer.

EXAMPLES 46–65

These examples illustrate the application of our invention to three-component polymer compositions and also show how the polymerisation of the second component may be carried out in a separate preliminary stage as part of the preparation of the catalyst.

Table 8 shows details of pre-polymerisations giving catalysts bearing small amounts of second component and other polymers. Catalysts A–G were prepared by the following general method.

The stirred reaction vessel was vacuum purged with dry nitrogen and about 58 millimoles of titanium trichloride (prepared as in Example 1) and 105 millimoles of diethyl aluminium monochloride were introduced as slurry and solution, respectively, in high boiling hydrocarbon diluent. The temperature was raised to 60° C. and the monomer introduced. After the polymerisation time the unchanged monomer was removed by repeated vacuum-purging with nitrogen. The conversion of monomer to polymer was measured by removing a 10 ml. aliquot of slurry, de-ashing from aluminium and titanium by repeated

TABLE 7

| Example | Second component | Weight percent second component in composition | Properties of quenched mouldings | | | | Properties of cooled mouldings | | | | Experimental details | | | |
|---|---|---|---|---|---|---|---|---|---|---|---|---|---|---|
| | | | Pressing temp., °C | Percent transmission | Percent haze | Mean spherulite size ($\mu$) | Pressing temp., °C | Percent transmission | Percent haze | Mean size ($\mu$) spherulite | Method | Second component (g.) | Polymerisation time for second component (hours) | 4-methyl pentene-1 addition time (hours) |
| 19 | 3-methyl pentene-1 | 0.4 | 280 | 90 | 2.8 | 4 | 280 | 52 | 18.3 | 5 | 1 | 2.0 | 66 | |
| 20 | do | 0.5 | 280 | 90 | 2.4 | 3 | 280 | 46 | 24.7 | 4 | 1 | 10.0 | 23 | |
| 21 | do | 1.2 | 280 | 88 | 4.4 | 4 | 280 | 40 | 27.8 | 3 | 1 | 4.0 | 66 | |
| 22 | 3-methyl butene-1 | <1 | 280 | 76 | 8.1 | 2 | 280 | 64 | 23.7 | 5 | 1 | 2.0 | 24 | |
| 23 | do | 2 | 280 | 18 | 28.3 | 4 | 280 | 2.0 | >50 | 6 | 1 | 10.0 | 22 | |
| 24 | 4,4-dimethyl pentene-1 | <2 | 280 | 91 | 2.0 | 3 | 280 | 46 | 24.0 | 5 | 1 | 2.0 | 24 | |
| 25 | do | <2 | 280 | 85 | 2.1 | 4 | 280 | 20 | 20.8 | 8 | 1 | 4.0 | 22 | |
| 26 | do | 4.5 | 280 | 70 | 12.9 | 6 | 280 | 22 | 20.6 | 3 | 1 | 20.0 | 24 | |
| 27 | 3-methyl pentene-1 | 0.7 | 280 | 96 | 1.4 | 3 | 280 | 91 | 4.5 | 4 | 2 | 3.2 | | 12 |
| 28 | do | 0.9 | 280 | 95 | 3.9 | 3 | 280 | >72 | <19 | 2 | 2 | 1.2 | | 12 |
| 29 | do | 2.3 | 280 | 95 | 1.5 | 3 | 280 | 96 | 3.0 | 15 | 2 | 9.2 | | 12 |
| 30 | 3-methyl butene-1 | ≈1 | 280 | 90 | 3.6 | 3 | 290 | 68 | 21.5 | 4 | 2 | 20.0 | | 11 |
| 31 | do | 1 | 280 | 88 | 4.8 | 3 | 280 | 79 | 8.6 | 3 | 2 | 20.0 | | 72 |
| 32 | 4,4-dimethyl pentene | 4 | 280 | 43 | 3.0 | 2 | 290 | 29 | 31.0 | 4 | 2 | 20.0 | | 11 |
| 33 | do | 2.5 | 280 | 96 | 14.0 | 2 | 280 | 96 | 2.3 | 3 | 2 | 10.0 | | 72 |
| 34 | do | 3.5 | 280 | 95 | 2.0 | 2 | 290 | 92 | 1.5 | 4 | 2 | 20.0 | | 11 |
| 35 | 3-methyl pentene-1 | 0.7 | 280 | 94 | 1.0 | 4 | 290 | 67 | 15.7 | 4 | 3 | 2.0 | 24 | |
| 36 | do | 1.4 | 290 | 86 | 1.4 | 4 | 280 | 79 | 14.0 | 3 | 3 | 4.0 | 24 | |
| 37 | do | 4.1 | 310 | 90 | 2.2 | 3 | 280 | 22 | 23.1 | 5 | 3 | 9.2 | 24 | |
| 38 | 3-methyl butene-1 | ≈1 | 280 | 55 | 3.2 | 3 | 280 | 36 | 31.8 | 4 | 3 | 4.0 | 70 | |
| 39 | do | 3 | 310 | 94 | 8.6 | 4 | 280 | 34 | 29.3 | 5 | 3 | 10.0 | 48 | |
| 40 | 4,4-dimethyl pentene | <2 | 280 | 93 | 3.9 | 3 | 280 | 68 | 22.7 | 4 | 3 | 2.0 | 72 | |
| 41 | do | 3 | 280 | 88 | 2.4 | 4 | 280 | 41 | 19.3 | 3 | 3 | 4.0 | 72 | |
| 42 | do | 4.5 | 280 | 80 | 4.5 | 3 | 280 | 46 | 10.5 | 3 | 3 | 10.0 | 72 | |
| 43 | do | <1 | 280 | 96 | 1.4 | 4 | 280 | 44 | 7.5 | 4 | 4 | 20.0 | 72 | |
| 44 | 3-methyl butene-1 | <1 | 280 | 96 | 1.4 | 3 | 280 | 69 | <14.5 | 4 | 4 | 1.5 | 16 | |
| 45 | do | ≈1 | 280 | 89 | 1.9 | 2 | 280 | 47 | 31.3 | 5 | 4 | 3.0 | 16 | | washing with dry isopropanol and acetylacetone mixture, drying and weighing the polymer. Aliquots were also removed to carry out the main polymerisations.

Catalysts H–S were prepared by the following method.

A stirred reaction vessel was vacuum purged with dry nitrogen, and 50 millimoles of titanium trichloride (prepared as in Example 2) and 100 millimoles of diethyl aluminium chloride were introduced as slurry and solution, respectively, in high boiling hydrocarbon diluent. The temperature was raised to 60° C. and 4-methyl pentene-1 introduced together in some cases with hexene-1 or second component, or both, as shown in the table. Polymerisation took place for the time shown. In some cases a second stage of pre-treatment was carried out at 60° C. by introducing second component, sometimes with other monomers, directly after the first stage. Deviations from the above procedure are noted in the table. At the end of polymerisation a 10 ml. aliquot of slurry was removed and de-ashed as previously described. The pre-treatment polymer was analysed by infra-red methods and conversions were calculated from these data. In all cases some unchanged monomer (mostly second component) was left, and very little further polymerisation occurred on standing at room temperature. The amount of monomer transferred to the main polymerisations was too small to have any significant effect upon the course of polymerisation.

and 10 ml. dry acetylacetone. The polymer was de-ashed by repeated washing with dry isopropanol until the aluminium and titanium levels reached low values, generally less than about 20 and 10 p.p.m. respectively. The polymer was then filtered and dried in a fluid-bed air drier at 100° C. Yields varied from about 70–95% of the monomer feed, while the percentage of soluble polymer varied from about 0.5–3% of the total polymer yield. In Examples 59 and 60 an initial charge of 445 grams 4-methyl pentene-1 and 50 grams hexene-1 monomer was used, no further monomer being added subsequently. The hexene-1 monomer used in Example 59 was 67% pure while that used in Example 61 was nearly 100% pure. Optical properties of mouldings, both quenched and cooled in the press, of the polymerisation product are shown in Table 9, together with comparative data for a composition B containing no second component polymer, but otherwise made in a similar manner.

EXAMPLES 66 AND 67

Into the vacuum purged polymerisation vessel 250 ml. of high boiling hydrocarbon diluent were introduced and vacuum purged at 60° C. with stirring. 12 millimoles diethyl aluminum chloride and 6 millimoles of titanium trichloride (prepared as in Example 2) were added, followed by 7.5 ml. 3-methyl pentene-1. After 22 hours at 60° C. the temperature was lowered to 50° C., and 445

TABLE 8

| Catalyst | Volume of diluent (ml.) | First stage | | | | Second stage | | | |
|---|---|---|---|---|---|---|---|---|---|
| | | Monomer(s) | Amount (ml.) | Time (hours) | Conversion (moles monomer per mole Ti) | Monomer(s) | Amount (ml.) | Time (hours) | Conversion (moles monomer per mole Ti) |
| A | 143.5 | 3-methyl butene-1 | (¹) | 1 | 5.5 | | | | |
| B | 142 | 3-methyl pentene-1 | 51 | 27 | 6.0 | | | | |
| C | 110 | do | 10 | 21 | 0.9 | | | | |
| D | 116.5 | 3-methyl butene-1 | 5 | 21 | 0.25 | | | | |
| E | 127.5 | do | (¹) | 5 | 8.0 | | | | |
| F | 143.5 | 3-methyl pentene-1 | 21 | 21 | 2.25 | | | | |
| G | 182.5 | do | 63 | 29½ | 7.4 | | | | |
| H | 188 | 4-methyl pentene-1 | 31½ | 1 | 4.3 | 3-methyl butene-1 | 14 | 3 | 1.55 |
| I | 188 | {4-methyl pentene-1, 3-methyl butene-1} | {31½, 28} | 4 | {4.2, 3.15} | | | | |
| J | 292 | 4-methyl pentene-1 | 72 | ²1 | 17 | {3-methyl butene-1, 4-methyl pentene-1} | {14, 26} | 3 | {1.05, ³7.5} |
| K | 188 | do | 31½ | 1 | | {3-methyl pentene-1, Hexene-1} | {26, 6} | 3 | {2.4, 0.6} |
| L | 188 | {4-methyl pentene-1, 3-methyl butene-1, hexene-1} | {29, 31½, 3} | 4 | {3.6, 3.7, 0.9} | | | | |
| M | 288 | 4-methyl pentene-1 | 63 | ⁴4 | 9.7 | 3-methyl butene-1 | 20 | 3 | 2.8 |
| N | 188 | {4-methyl pentene-1, 3-methyl butene-1} | {72, 16} | ²4 (⁵) | | | | | |
| O | 188 | {4-methyl pentene-1, 3-methyl butene-1} | {47½, 28} | 4 | {7.7, 2.1} | | | | |
| P | 188 | {4-methyl pentene-1, 3-methyl butene-1} | {63, 28} | 4 | {10, 2.3} | | | | |
| Q | 188 | {4-methyl pentene-1, 3-methyl pentene-1} | {47½, 28} | 4 | {7.5, 2.7} | | | | |
| R | 188 | {4-methyl pentene-1, 4,4-dimethyl pentene-1} | {47½, 28} | 4 | {7.5, 1.4} | | | | |
| S | 188 | 4-methyl pentene-1 | 31½ | 1 | 4.3 | {3-methyl butene-1, Hexene-1} | {29, 31½} | 3 | {2.5, 3.65} |

¹ Saturated solution.
² 30 millimoles TiCl₃:60 millimoles aluminium diethyl chloride.
³ Total.
⁴ Temperature of first stage of polymerisation, 0° C.
⁵ 3-methyl butene-1 feed over 3 hours.

Main polymerisations using decene-1 as third component were carried out as follows:

The stirred polymerisation vessel was vacuum purged with dry nitrogen and one litre of high boiling hydrocarbon diluent introduced. The temperature was raised to 60° C. and the diluent vacuum purged once. An aliquot of pre-treated catalyst slurry calculated to give the desired titanium concentration was added, followed by 269 ml. 4-methyl pentene-1 and 5½ ml. decene-1. A feed of 427 ml. 4-methyl pentene-1 plus 8½ ml. decene-1 was continued for 2 hours. After 4 more hours the polymerisation was arrested by injection of 50 ml. dry isopropanol grams 4-methyl pentene-1 and 50 grams hexene-1 monomer solution were fed over 2 hours. The polymerisation was continued for 4 more hours, and then killed with dry isopropanol and the solid de-ashed in the manner previously described.

In Example 66 crude hexene-1 monomer of 67% purity was used, giving a yield of 23% by weight on monomer fed, of which 17% was dissolved in the diluent. In Example 67 the hexene-1 was nearly 100% pure and a yield of 69% by weight, of which 7% was dissolved in the diluent, was obtained. Optical properties of mouldings are shown in Table 9.

TABLE 9

| Example or comparative experiment | Catalyst (see Table 8) | Catalyst concentration (millimoles/litre TiCl₃) | Second component | Weight percent second component | Third component | Weight percent third component | Quenched mouldings Percent transmission | Quenched mouldings Percent haze | Quenched mouldings Mean spherulite size (μ) | Cooled mouldings Percent transmission | Cooled mouldings Percent haze | Cooled mouldings Mean spherulite size (μ) |
|---|---|---|---|---|---|---|---|---|---|---|---|---|
| 46 | F | 8.0 | 3-methyl pentene-1 | 0.4 | Decene-1 | 2 | 96 | 2.2 | 3 | 81 | 2.7 | 3 |
| 47 | B | 5.0 | do | 0.6 | do | 2 | 90 | 2.6 | 4 | 73 | 3.6 | 3 |
| 48 | G | 5.0 | do | 0.82 | do | 2 | 86 | 3.0 | 5 | 83 | 2.8 | 4 |
| 49 | D | 8.0 | 3-methyl butene-1 | 0.04 | do | 2 | 95 | 3.5 | 4 | | | |
| 50 | C | 12.7 | do | 0.2 | do | 2 | 93 | 3.3 | 5 | 94 | 5.2 | 4 |
| 51 | A | 5.0 | do | 0.6 | do | 2 | 92 | 3.7 | 3 | 89 | 4.6 | 3 |
| 52 | H | 8.0 | do | 0.2 | do | 2 | 97 | <1.4 | 4 | 98 | 3.5 | 4 |
| 53 | M | 8.0 | do | 0.25 | do | 2 | 98 | 1.0 | 3 | 96 | 3.4 | 4 |
| 54 | J | 5.0 | do | 0.1 | do | 2 | 98 | 1.0 | 3 | 95 | 3.3 | 4 |
| 55 | I | 8.0 | do | 0.3 | do | 2 | 97 | 1.2 | 3 | 94 | 5.0 | 5 |
| 56 | L | 8.0 | do | 0.5 | Decene-1 / Hexene-1 | 0.05 / 2 | 97 | 1.5 | 2 | 95 | 3.4 | 4 |
| 57 | S | 5.5 | do | 0.2 | Decene-1 / Hexene-1 | 0.55 / 2 | 98 | 1.1 | 2 | 96 | 2.5 | 4 |
| 58 | K | 8.0 | do | 0.4 | Decene-1 / Hexene-1 | 0.1 / 6.7 | 97 | 1.5 | 2 | 96 | 4.8 | 4 |
| 59 | E | 6.0 | do | 2.0 | Hexene-1 | 10 | | | 4 | | | |
| 60 | F | 8.0 | do | 1.15 | do | 2 | 98 | 1.1 | 3 | 94 | 4.2 | 4 |
| 61 | N | 8.0 | do | 0.25 | Decene-1 | 2 | 98 | 1.5 | 2 | 93 | 6.4 | 4 |
| 62 | O | 8.0 | do | 0.3 | do | 2 | 98 | 1.0 | 3 | 97 | 2.6 | 4 |
| 63 | P | 8.0 | do | 0.4 | do | 2 | 97 | 1.7 | 2 | 92 | 4.6 | 4 |
| 64 | Q | 8.0 | 3-methyl pentene-1 | 0.4 | do | 2 | 98 | 2.2 | 3 | 47 | 1.9 | 5 |
| 65 | R | 8.0 | 4,4-dimethyl pentene-1 | 0.3 | do | 2 | 90 | 16 | 40 | 60 | 17.4 | 40 |
| B | | | | | | | 59 | | 2 | | 4.8 | 3 |
| 66 | | | | | Hexene-1 | <6, 7 | 67 | | 4 | 92 | 3.8 | 4 |
| 67 | | | 3-methyl pentene-1 | <3.8 | do | <10 | 93 | | | | | |

I claim:

1. A polymeric composition made up of predominantly 4-methyl-pentene-1 monomer units, containing dispersed throughout the composition some and up to 5% by weight of polymer units of a second component which is a different branched chain aliphatic 1-olefin, the homopolymer of which melts above 320° C., or vinyl cyclohexane, said composition being prepared by sequentially polymerizing said 4-methyl-penten-1 monomer and said second component in the presence of a stereospecific catalyst.

2. A polymeric composition made up of predominantly 4-methyl-pentene-1 monomer units, containing dispersed throughout the composition some and up to 5% by weight of polymer units of a second component which is a different branched chain aliphatic 1-olefin, the homopolymer of which melts above 320° C., or vinyl cyclohexane, said polymeric composition having a melt flow index of from 0.01 to 1,000, an ash content of below 0.02%, a mean spherulite size when quench compression molded at 265-280° C. of not more than 5 microns, and a light transmission of at least 90% in ⅛ inch section, said composition being prepared by sequentially polymerizing said 4-methyl-pentene-1 monomer and said second component in the presence of a stereospecific catalyst.

3. A polymeric composition made up of predominantly 4-methyl-pentene-1 monomer units, containing dispersed throughout the composition some and up to 5% by weight of polymer units of a second component selected from the group consisting of 3-methyl-pentene-1, 3-methyl-pentene-1 and 4,4-dimethyl-pentene-1, the polymeric composition having a melt flow index of from 0.01 to 1,000, an ash content of below 0.02%, a mean spherulite size quench compression molded at 265-280° C. of not more than 5 microns, and a light transmission of at least 90% in ⅛ inch section, said composition being prepared by sequentially polymerizing said 4-methyl-pentene-1 monomer and said second component in the presence of a stereospecific catalyst.

4. A composition as claimed in claim 2 having a haze in ⅛ inch section of less than 5%.

5. A composition as claimed in claim 2 having a content of said second component below 1% by weight.

6. A composition as claimed in claim 3 wherein the second component is 3-methyl-pentene-1 or 4,4-dimethyl-pentene-1.

7. A composition as claimed in claim 2 which contains up to 30% by weight of monomer units of a third component which is a linear 1-olefine having from 4 to 18 carbon atoms.

8. A process for producing polymeric compositions made up of predominantly 4-methyl-pentene-1 monomer units and having a mean spherulite size when quench compression molded at 265-280° C. of not more than 5 microns, said process comprising sequentially polymerizing, in the presence of a stereospecific catalyst, 4-methyl-pentene-1 with some and up to about 5% by weight of a second component which is a different branched chain aliphatic 1-olefin, the homopolymer of which melts above 320° C., or vinyl cyclohexane.

9. A process for producing polymeric composition made up of predominantly 4-methyl-pentene-1 polymer units, said process comprising sequentially polymerizing, in the presence of a stereospecific catalyst, 4-methyl-pentene-1 with some and up to 5% by weight of a second component selected from the group consisting of 3-methyl-butene-1, 3-methyl-pentene-1 and 4,4-dimethyl-pentene-1, wherein the amount of second component is such that the polymeric composition has a mean spherulite size when quench compression molded at 265–280° C. of not more than 5 microns, and a light transmission in ⅛ inch section at least 90%.

10. A process as claimed in claim 8 wherein the second component is polymerized in a separate preliminary stage.

11. A process as claimed in claim 8 wherein initially 4-methyl-pentene-1 or a linear 1-olefine having from 4 to 18 carbon atoms is polymerized in small amount, subsequentially the second component is polymerized and thereafter the bulk of the 4-methyl-pentene-1 is polymerized.

12. A process as claimed in claim 8 wherein the composition contains up to 1% by weight of the second component.

13. A process as claimed in claim 9 wherein the second component is 4,4-dimethyl-pentene-1 or 3-methyl-pentene-1.

14. A process as claimed in claim 8 wherein the composition contains up to 2% by weight of 3-methyl-pentene-1 which is polymerized before any substantial quantity of any other monomer has been polymerized.

15. A process as claimed in claim 8 wherein a third component which is a linear 1-olefine having from 4 to 18 carbon atoms is also polymerized.

16. A process as claimed in claim 15 wherein the third component is hexene-1 or decene-1.

17. An article produced by melt shaping a polymeric composition made up of predominantly 4-methyl-pentene-1 monomer units and containing dispersed throughout the polymeric composition, a second component selected from the group consisting of 3-methyl-pentene-1, 3-methyl-butene-1 and 4,4-dimethyl-pentene-1, the polymeric composition having a melt flow index of between 0.01 and 1,000 and an ash content of below 0.02%, said second component being present in an amount and dispersed to a degree that the polymeric composition has a mean spherulite size when quench compression molded at 265–280° C. of not more than 5 microns and a light transmission of at least 90% in ⅛ inch section, said composition being prepared by sequentially polymerizing said 4-methyl-pentene-1 monomer and said second component in the presence of a stereospecific catalyst.

18. A process as claimed in claim 10 wherein in the separate preliminary stage a small amount of 4-methyl-pentene-1, or a linear 1-olefine having from 4 to 18 carbon atoms is polymerized, subsequently the second component is polymerized, such polymerizations being effected in the presence of a high concentration of catalyst, the catalyst concentration is reduced, and the bulk of the 4-methyl-pentene-1, together with 0–30% of a third component which is a linear 1-olefine having from 4 to 18 carbon atoms is then polymerized.

19. The process of preparing block copolymers which comprises sequentially polymerizing in situ in indifferent order (1) a branched olefin having the formula

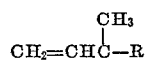

in which R is an alkyl radical of 1 to 3 carbon atoms and (2) a mixture of 4-methyl-pentene-1 and a linear 1-olefin having from 4 to 18 carbon atoms in the presence of a stereospecific polymerization catalyst, said copolymer containing some up to 5% by weight of branched chain, some up to 30% by weight of linear 1-olefin, and the remainder 4-methyl-pentene-1.

References Cited
UNITED STATES PATENTS

| | | | |
|---|---|---|---|
| 3,091,601 | 5/1963 | Reding | 260—80.5 G X |
| 3,210,332 | 9/1965 | Lyons et al. | 260—80.5 G X |
| 3,332,920 | 7/1967 | Clark et al. | 260—88.2 |

FOREIGN PATENTS

| | | | |
|---|---|---|---|
| 849,090 | 9/1960 | Great Britain | 260—88.2 |

HARRY WONG, JR., Primary Examiner

U.S. Cl. X.R.

260—80.78, 88.2 F, 94.9 B, 896, 897 A